United States Patent
Spinnler

(10) Patent No.: US 11,305,588 B2
(45) Date of Patent: Apr. 19, 2022

(54) TREAD FOR CIVIL ENGINEERING MACHINE TIRE COMPRISING IMPROVED VENTILATION CAVITIES

(71) Applicant: COMPAGNIE GENERALE DES ETABLISSEMENTS MICHELIN, Clermont-Ferrand (FR)

(72) Inventor: Olivier Spinnler, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 341 days.

(21) Appl. No.: 16/462,018

(22) PCT Filed: Nov. 22, 2017

(86) PCT No.: PCT/FR2017/053199
§ 371 (c)(1),
(2) Date: May 17, 2019

(87) PCT Pub. No.: WO2018/096259
PCT Pub. Date: May 31, 2018

(65) Prior Publication Data
US 2019/0329597 A1    Oct. 31, 2019

(30) Foreign Application Priority Data
Nov. 22, 2016    (FR) ........................................ 1661350

(51) Int. Cl.
*B60C 11/03*    (2006.01)
(52) U.S. Cl.
CPC ...... *B60C 11/032* (2013.01); *B60C 2200/065* (2013.01)

(58) Field of Classification Search
CPC ............. B60C 11/032; B60C 2200/065; B60C 2200/06; B60C 11/03
See application file for complete search history.

(56) References Cited

U.S. PATENT DOCUMENTS

| 9,738,121 B2 | 8/2017 | Mayni et al. |
| 2005/0247388 A1* | 11/2005 | Ohsawa ................ B60C 11/032 152/209.9 |

(Continued)

FOREIGN PATENT DOCUMENTS

| JP | H 05-96913 | 4/1993 |
| JP | H 10 278510 | 10/1998 |

(Continued)

OTHER PUBLICATIONS

Machine Translation JPH0596913; Tsukagoshi, Tetsuto (Year: 1993).*

(Continued)

*Primary Examiner* — Robert C Dye
*Assistant Examiner* — Nicholas J Weiler
(74) *Attorney, Agent, or Firm* — Cozen O'Connor

(57) ABSTRACT

Tread (1) having tread surface (10) axially bounded by edge parts (11), and provided with cuts (3, 4) delimiting material parts forming raised elements (2), each raised element (2) comprising contact face (20), there being formed, in a plurality of raised elements (2), a ventilation cavity (5) having a depth at least equal to 70% of the thickness of the tread material to be worn away, each ventilation cavity (5) being delimited by wall surface (50) ending at bottom surface (530). Each ventilation cavity (5) comprises first cavity part (51) continued into the depth by second cavity part (52). The first cavity part (51) is situated between the tread surface and intermediate depth level H1 situated at between 30% and 70% of maximum depth H of ventilation cavity (5), the mean relief angle A of the wall is at least equal (Continued)

to 20 degrees. In the second cavity part (52), mean relief angle B of the wall is at most equal to 15 degrees.

12 Claims, 2 Drawing Sheets

(56) References Cited

U.S. PATENT DOCUMENTS

| | | | | |
|---|---|---|---|---|
| 2012/0118461 | A1* | 5/2012 | Matsuzawa | B60C 11/0311 |
| | | | | 152/209.18 |
| 2014/0299242 | A1 | 10/2014 | Chauvin | |
| 2017/0096035 | A1* | 4/2017 | Nugier | B60C 11/24 |

FOREIGN PATENT DOCUMENTS

| | | | | |
|---|---|---|---|---|
| JP | 2010 247707 | | 11/2010 | |
| JP | 2010 247714 | | 11/2010 | |
| JP | 20100247707 A | * | 11/2010 | B60C 11/032 |
| JP | 2012 171505 | | 9/2012 | |
| KR | 20060053728 A | * | 5/2006 | |
| WO | WO 2015/140122 | | 9/2015 | |

OTHER PUBLICATIONS

Machine Translation JP 2010247714, Harada, Mitsuhiro (Year: 2010).*
Machine Translation WO 2015140122, Nugier, Franck (Year: 2015).*
KR 20060053728 Machine Translation, Shin, Dong Yeop (Year: 2006).*
JP 2010247707 Machine Translation, Harada, Mitsuhiro (Year: 2010).*

* cited by examiner

TREAD FOR CIVIL ENGINEERING MACHINE TIRE COMPRISING IMPROVED VENTILATION CAVITIES

RELATED APPLICATIONS

This is a U.S. National Phase Application under 35 USC 371 of International Application PCT/FR2017/053199 filed on Nov. 22, 2017.

This application claims the priority of French application no. 16/61350 filed Nov. 22, 2016, the entire content of which is hereby incorporated by reference.

FIELD OF THE INVENTION

The invention relates to a tire for a civil engineering or off-road vehicle, the tread of which is thick and has a thickness at least equal to 60 mm. The invention relates more particularly to a novel geometry of a thermal ventilation means of this type of tread in order to reduce the temperature in the tread during operation.

BACKGROUND OF THE INVENTION

The working of mines requires the use of suitable vehicles that are notably able to carry very heavy loads of materials processed in these mines, covering longer or shorter distances over ground that has some degree of slope and is very often covered with bodies or objects that may impair grip performance of the vehicles either in terms of traction or in terms of braking or even in terms of path-following performance. These vehicles with a high material bearing capability are fitted with tires of suitable size to allow very large quantities of materials to be moved around. These tires have very large dimensions compared with other tire categories, notably far bigger than those of tires intended for heavy goods vehicles.

Usually, a tire that is intended to be fitted to a civil engineering or off-road vehicle is provided with a tread surmounting, radially towards the outside, a crown reinforcement itself surmounting a carcass reinforcement. This tread has a tread pattern formed by raised elements (ribs or blocks), these raised elements being delimited by a plurality of cuts (grooves, sipes, cavities). Moreover, the tread has a thickness which is at least equal to 60 mm and can range up to at least 125 mm for certain applications; this thickness is determined as being the greatest of the depths of the grooves in the new state. This depth corresponds to the height of material of the tread to be worn away during running.

The raised elements of the tread of a tire have contact faces radially on the outside of the tread, these contact faces, which form the tread surface of the tread, being provided to come into contact with the ground during running and to transmit all the forces between the ground and the tire. The cuts have depths at most equal to the thickness of the tread and have geometries, seen in section, which are appropriate to limit the retention of stones and other objects present on the ground.

This type of tread has shoulder parts axially bordering each side of said tread. These shoulder parts may be continuous so as to form ribs or be provided with transverse or oblique grooves so as to form a plurality of blocks.

The great thickness of the tread associated with the stresses occurring in the zone of contact with the ground generate heating that may cause premature damage leading to the tire being removed; this heating within the material is related to hysteresis characteristics of the rubber materials of which this tread is made.

It is known—see notably the documents WO 2015/140122 A1, EP 2655093 A1, JPH10278510 A—to form cavities in the raised elements, which may be either ribs or blocks, one of the functions of said cavities being to create ventilation in order to evacuate heat generated during running. The depth and the volume of these cavities are chosen as per the need to reduce the heat level. These cavities are generally open either laterally to the tread or onto the tread surface of the tread, that is to say onto the surface of the tread that comes into contact with the ground. The desired effect is a ventilation effect leading to limiting of the temperature in the interior of the tread, specifically closest to the crown reinforcements. To this end, the depth of the cavities is appropriate for being in proportion to the thickness of the tread and the ends of the crown reinforcements. Other documents, such as JP 2010-247707, JP 2012-171505, show tires of which the treads are provided with cavities in their edges.

Of course, in order to be effective, these ventilation cavities have to have relatively large dimensions both in the thickness of the tread and at the tread surface in order to create a sufficient heat exchange area and thus promote good ventilation by ambient air.

This cavity depth is, as indicated in the application published under the number WO 2015/140122 A1, at least equal to 30% and even more preferably at least equal to 50% of the total height of material to be worn away.

Respecting these conditions may lead to deep cavities that open onto the tread surface and indeed promote cooling, but during running, these may capture foreign bodies or objects present on the ground on which the tire is running. These bodies captured in a cavity may be ejected if they have small dimensions compared with the dimensions of the opening section of the cavity or may be trapped in the cavity on account of the deformable elastic nature of the material forming the tread, which material may exert retaining forces on the foreign bodies located in the cavity.

In the latter case, the foreign body may remain jammed in the cavity and, as a result of the creeping movements that occur on each turn of the wheel, move further into the material of the tread until possibly attacking the bottom of the cavity and then potentially the reinforcement of the tire situated radially on the inside of the tread.

Having observed this drawback, the applicants set themselves the objective of optimizing the geometry of ventilation cavities intended to promote heat exchange between the solid parts of the tread and the surrounding air while reducing the risks of attack by foreign bodies likely to enter these cavities and remain trapped therein.

Definitions:

In the present document, a radial direction means any direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centred on the axis of rotation. This direction is perpendicular both to the axial direction and to a radial direction.

An equatorial mid-plane is a plane perpendicular to the axis of rotation and passing through the points of the tire that are radially farthest from the said axis. For a tread, this plane divides the tread widthwise into two halves of equal widths.

A rib is a raised element formed on a tread, this raised element extending in the circumferential direction and making a circuit of the tire. A rib comprises two lateral walls and a contact face, the latter being able to come into contact with the road surface during running.

A block is a raised element formed on a tread, this raised element being delimited by grooves that are oriented circumferentially or substantially circumferentially and grooves that are oriented transversely or substantially transversely (the latter grooves being able to be oriented obliquely). A block comprises two lateral walls and a contact face that can come into contact with the road surface during running.

A cut generically denotes either a groove or a sipe and corresponds to the space delimited by walls of material that face one another and are at a non-zero distance (referred to as the "width of the cut") from one another. It is precisely this distance that distinguishes a sipe from a groove; in the case of a sipe, this distance is appropriate for allowing the opposing walls that delimit said sipe to come into at least partial contact at least when in the contact patch in contact with the road surface. In the case of a groove, the walls of this groove cannot come into contact with one another even partially under usual running conditions.

A ventilation cavity is a void formed notably by moulding in a rib or a block of a tread. This ventilation cavity has a void volume in the new state and opens onto the contact face of the rib or block in the new state, this contact face being intended to come into contact with the ground on which the tire runs. The ventilation cavity is delimited by at least one wall, the intersection of which with the contact face of the raised element forms a corner edge having a closed contour, or by a plurality of corner edges forming a closed contour.

SUMMARY OF THE INVENTION

One aspect of the present invention is directed to a tire for a civil engineering work vehicle, this vehicle being intended to carry very heavy loads, this tire comprising a carcass reinforcement surmounted radially on the outside by a crown reinforcement, said crown reinforcement being covered by a tread.

The tread of this tire has a tread surface extending circumferentially all around the tire; the tread is bounded axially by edge parts defining a maximum width.

This tread has a thickness of material to be worn away at least equal to 60 mm; this thickness corresponds to the thickness of material measured between the tread surface intended to come into contact with the ground in the new state and a previously set wear limit.

This tread is provided with cuts delimiting material parts forming raised elements that may be either ribs or blocks, each raised element comprising a contact face, all of the contact faces of all the raised elements forming the tread surface of the tread that is intended to come into contact with the ground on which the tire provided with this tread runs.

In a plurality of raised elements, at least one ventilation cavity is formed. Each ventilation cavity opens in the new state onto the contact face of a raised element. Each cavity is delimited by at least one wall surface, this at least one wall surface ending at a bottom surface, the maximum distance of which from the tread surface in the new state corresponds to at least 70% of the thickness of material of the tread to be worn away.

The wall surface of a ventilation cavity intersects the tread surface along at least one corner edge, the geometric contour of which is closed. The wall surface of each ventilation cavity may be formed by a single surface, for example a conical surface, or by several surfaces. This wall surface may be considered to be formed by the meeting of a plurality of generatrices extending in the direction of the depth of the ventilation cavity, these generatrices being organized around an axis of the ventilation cavity, this axis extending in the direction of the depth of said cavity.

The tread according to an embodiment of the invention is such that each ventilation cavity comprises a first cavity part that is continued into the depth by a second cavity part, this second cavity part connecting to the cavity bottom. The depth of the cavity bottom may correspond to the minimum of material once the tread is entirely worn before it is renewed.

In the first cavity part situated between the tread surface and an intermediate depth level situated at between 30% and 70% of the maximum depth of the cavity, the mean relief angle of the wall delimiting the ventilation cavity is at least equal to 20 degrees. This relief angle is taken to be the inclination angle of the generatrices of the wall delimiting the first part of the cavity.

In the second cavity part that continues the first cavity part into the depth as far as the bottom of the cavity, the mean relief angle of the wall delimiting the second part of the ventilation cavity is at most equal to 15 degrees. This relief angle is taken to be the inclination angle of the generatrices of the wall delimiting the second part of the cavity with a direction perpendicular to the tread surface of the tread.

The mean angle should be understood as meaning that it is possible for the angle not to be constant along the generatrix in question but that each generatrix has to make an angle at least equal or at most equal to the limit value along the part in question (at least equal to 20 degrees in the first part and at most equal to 15 degrees in the second part).

Moreover, the maximum cross-sectional area of the second cavity part is at least equal to 40% of the minimum cross-sectional area of the first cavity part.

Advantageously, the difference between the relief angle of the first cavity part and the relief angle of the second part is at least equal to 15 degrees.

Advantageously, the ventilation cavities intersect the contact faces of the raised elements along an ellipse shape, the major axis of which is oriented transversely or at an angle at most equal to 15 degrees with the transverse direction.

Advantageously, the length of the major axis AA after predefined wear is at most equal to 1.25 times the length of the minor axis.

When the choice is made to produce elliptical shapes both for the first cavity part and the second cavity part, it is advisable for the major axes to have different orientations. The major axis of the first part may be preferably oriented in the transverse or axial direction of the tire, while the major axis of the second part Advantageously, the maximum width of the ventilation cavity measured close to the bottom of the cavity is less than 33% of the total depth of the cavity in the new state. This maximum width is measured at a distance from the bottom corresponding to 10% of the total depth of the cavity in the new state.

Advantageously, at least one intermediate part forming a sort of plateau separating the first part from the second part is formed, this plateau being inclined at a mean angle equal or close to 90 degrees to a radial direction. Close to 90 degrees in this case means at least equal to 70 degrees.

Preferably, the ventilation cavities are formed on each edge part axially delimiting the tread.

Preferably, when the edges of the tread have blocks separated by oblique or transverse grooves, the maximum circumferential dimensions of the ventilation cavities formed in each of these blocks are between 30% and 60% of the circumferential lengths of the blocks.

Another aspect of the invention relates to a tire provided with a tread as defined above, this tire being intended to be fitted to a front axle of a civil engineering vehicle intended to carry very heavy loads.

Advantageously, the innermost points of the tread at the bottom of the ventilation cavities are at a distance Hs from the crown reinforcement, this distance being non-zero and preferably at least equal to 10% of the maximum depth of the ventilation cavities.

Further features and advantages of the invention will become apparent from the following description given with reference to the appended drawing which shows, by way of nonlimiting example, several embodiments of the subject matter of the invention.

DETAILED DESCRIPTION OF THE FIGURES

To make the description easier to understand, the same references are employed for different variants, wherein a reference refers to one and the same structural or functional element.

Figure 1:
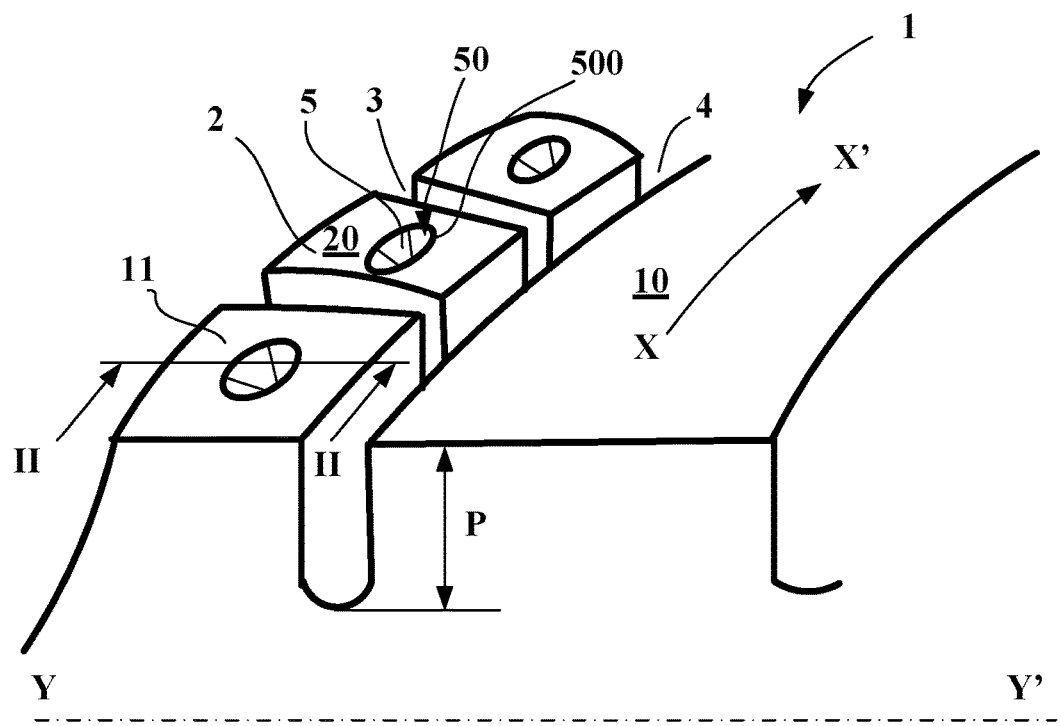
FIG. 1 shows a partial view of a tread according to an embodiment of the invention, this tread being shown in the new state.

FIG. 1 shows a partial view of a tread pattern of a tread 1 according to the invention, this tread 1 being shown in the new state, that is to say prior to any running. This tread 1 comprises a tread surface 10 intended to come into contact with the ground during running. This tread is intended to equip a tire for a vehicle that runs on ground that may be rough, this vehicle carrying very heavy loads. This tread is bounded axially by edges.

In this FIG. 1, a part of the tread forming one of the edges of this tread can be seen, this edge being made up of a plurality of blocks 2 delimited by transverse grooves 3 that open into a circumferentially oriented groove 4. These transverse grooves 3 and the circumferential groove 4 have one and the same depth P corresponding substantially to the thickness of material to be worn away during running. In the present case, the depth P of the grooves is equal to 88 mm. This great thickness (greater than 60 mm) generates heat levels that may be particularly harmful to the materials that make up the tread.

In this FIG. 1, the circumferential direction is indicated by an arrow XX' extending in the main direction of the circumferential groove 4. The direction indicated by the line YY' corresponds to the transverse or axial direction and is parallel to the axis of rotation of the tire.

Each block 2 of the edge comprises lateral faces and a contact face 20 intended to come into contact with the ground during running. The intersections of the contact face 20 with the lateral faces form, in the present case, four corner edges that are useful for ensuring the traction and the braking of the tire in different running phases.

Moreover, a ventilation cavity 5 having a total depth H substantially equal to the depth P of the grooves 3, 4 delimiting this block, i.e. 88 mm, is moulded into each block 2 of the edge. Each ventilation cavity 5 opens onto the contact face 20 of the block 2 and is delimited by a lateral wall 50 and a bottom wall 530, this bottom wall being visible in FIG. 2, which shows a part of the same tread in cross section. Each cavity 5 intersects, in the new state, the contact face 20 along a corner edge 500 having a circular closed geometric shape.

In this configuration, the tire intended to be fitted to a vehicle carrying very heavy loads is mounted on a front axle of said vehicle.

Figure 2:
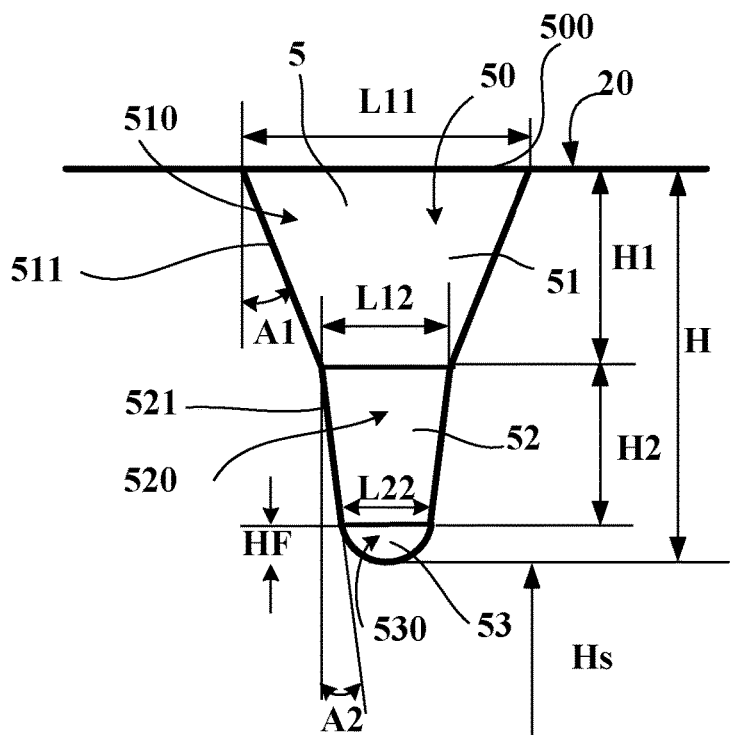
FIG. 2 shows a part of the tread from FIG. 1 in cross section in a radial section plane, the line of which is indicated by the line II-II in FIG. 1.

FIG. 2 shows the tread from FIG. 1 in a section plane, the line of which is indicated by the line II-II in FIG. 1. In this cross section, which is made at the edge of the tread, a ventilation cavity 5 of total depth H can be seen. This ventilation cavity 5 is formed in the depth of the tread by two cavity parts that are situated one in continuation of the other. A first cavity part 51 opens onto the contact surface 20 along a circular contour of diameter L11, this same first cavity part 51 ending at a depth H1, in this case equal to 49 mm, with a circular contour of diameter L12, which is less than the diameter L11. This first cavity part 51 is in the form of a truncated cone, the generatrix 511 of which makes an angle A1 with a direction perpendicular to the contact surface 20. In the example presented, this angle A1 is equal to 30 degrees.

This first cavity part 51 is continued by a second cavity part 52, likewise in the form of a truncated cone, the generatrix 521 of which makes an angle A2 with one and the same radial direction perpendicular to the tread surface, this angle A2 in this case being equal to 15 degrees. This second cavity part 52 has a depth H2 equal to 30 mm.

Finally, this second cavity part 52 ends with a cavity bottom 53 having a depth HF equal in the present case to 9 mm.

Moreover, this figure schematically shows an axial end of the crown reinforcement 7. Advantageously, the bottom of the cavities is at a non-zero distance Hs from this crown reinforcement 7 in order to create a sufficient quantity of material to protect said reinforcement while promoting the evacuation of the heat generated close to this reinforcement end.

By virtue of the arrangements according to the invention, it has been possible to substantially decrease the sensitivity to attack by external objects over which the tread can run, while lowering the heat level in operation, regardless of the state of wear of the tread.

In an embodiment variant that is not shown, the ventilation cavities have, on the contact face of the elements, an elliptical geometry, the major axis of which is oriented in the circumferential direction of the tire.

Figure 3:
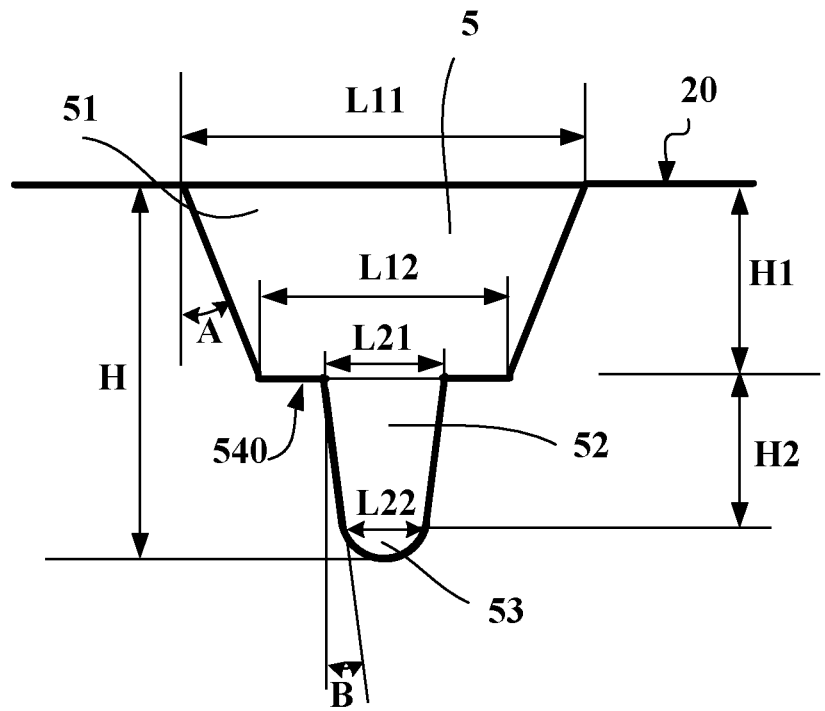
FIG. 3 shows a variant of a ventilation cavity according to an embodiment of the invention.

In another embodiment variant that is shown in cross section in FIG. 3, the connection between the first cavity part 51 and the second cavity part 52 of the ventilation cavity 5 is realized via a plateau 540 parallel to the contact face 20 of the raised element in the new state (the angle between this plateau and a radial direction is in this case 90 degrees). By virtue of the plateau 540, it is possible to very substantially reduce the maximum opening diameter L21 of the second cavity part 52. This diameter L21 is less than the diameter L12 of the bottom of the first cavity part 51, by around 50% in the case presented. Thus, the maximum cross-sectional area of the second cavity part is equal to 50% of the minimum cross-sectional area of the first cavity part.

This arrangement is favourable both for repelling the foreign bodies captured in the first cavity part 51 and for realizing good ventilation of the material. The relief angle B of the second cavity part 52 is less than the relief angle A of the first cavity part 51, these two angles being measured in their respective areas.

Figure 4:
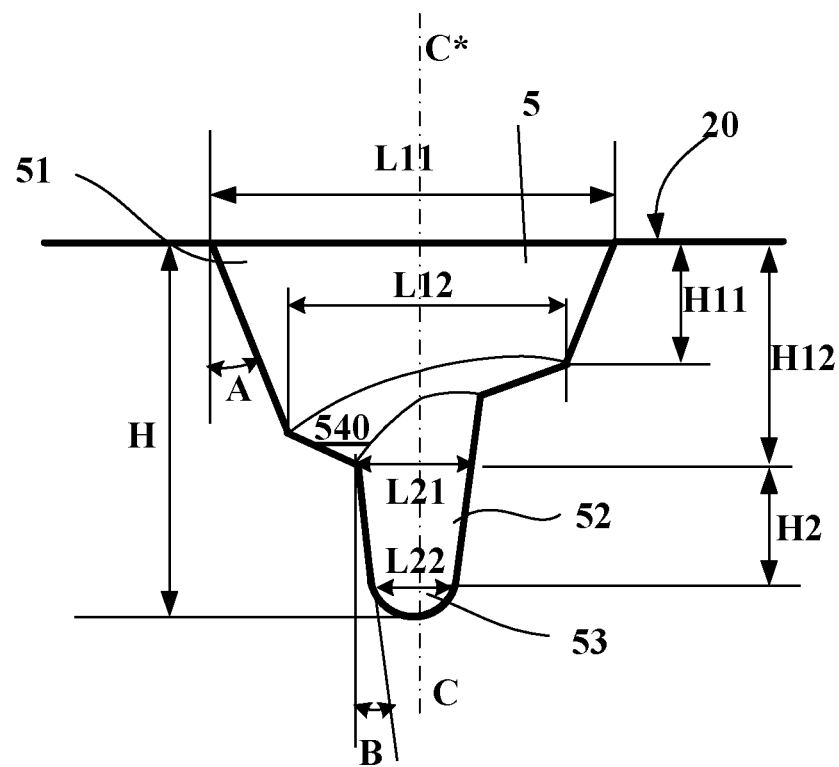
FIG. 4 shows a variant of a ventilation cavity according to an embodiment of the invention.

In another embodiment variant that is shown in cross section in FIG. 4, the connection between the first cavity part 51 and the second cavity part 52 is realized by an intermediate part 540, as is the case in the variant shown in FIG. 3. The difference introduced in this variant relates to the intermediate part, which comprises two parts that are offset in the depth, these two offset parts being connected together by connecting parts. Each of the offset parts makes an angle of around 15 degrees with the tread surface in the new state. These offset parts will not appear at the tread surface at the same time following partial wear: the first offset part appears at the tread surface after wear corresponding to a depth equal to H11, while the second offset part only appears after wear corresponding to a depth H12 that is greater than the depth H11. This is particularly favourable for obtaining regular wear close to the ventilation cavity throughout the wearing of the tire provided with this tread and thus in particular at the passage from the first cavity part to the second cavity part.

The invention which has just been described with the aid of these examples is not intended to be limited thereto and various modifications can be made thereto without departing from the scope defined by the claims. In particular, the described ventilation cavities can be provided in the tread in parts other than the edges.

The invention claimed is:

1. A tread for a tire of a civil engineering work vehicle, this vehicle being intended to carry very heavy loads, the tread comprising:
   a tread surface adapted to come into contact with the ground,
   edge parts that axially bound the tread;
   a thickness of material to be worn away at least equal to 60 mm, said thickness corresponding to the thickness of material measured between the tread surface adapted to come into contact with the ground in the new state and a previously set wear limit,
   the tread being provided with cuts delimiting material parts forming raised elements, each said raised element comprising a contact face, all of the contact faces of all the raised elements forming the tread surface of the tread,
   there also being formed, in a plurality of said raised elements, at least one ventilation cavity that opens in the new state onto the contact face of said raised elements, each said ventilation cavity having a depth at least equal to 70% of the thickness of material of the tread to be worn away, each said ventilation cavity being delimited by a wall surface ending at a bottom surface, the wall surface of a said ventilation cavity intersecting the tread surface along a closed corner edge contour,
   wherein each said ventilation cavity comprises:
   a first cavity part that is continued into the depth by a second cavity part, said second cavity part connecting to a cavity bottom
   wherein, in the first cavity part situated between the tread surface and an intermediate depth level H1 situated at between 30% and 70% of the maximum depth H of the ventilation cavity, the mean relief angle A of the wall delimiting the ventilation cavity is at least equal to 20 degrees,
   wherein in the second cavity part that continues the first cavity part into the depth as far as the bottom of the cavity, the mean relief angle B of the wall delimiting the ventilation cavity is at most equal to 15 degrees, and
   wherein the ventilation cavities intersect the contact faces of the raised elements along a contour having the shape of an ellipse, the major axis of which is oriented transversely,
   wherein the major axis has a different length than a minor axis of the ellipse of the first cavity part.

2. The tread according to claim 1, wherein the length of the major axis of the ellipse after predefined wear is at most equal to 1.25 times the length of its minor axis.

3. The tread according to claim 1, wherein the difference between the relief angle A of the first cavity part and the relief angle B of the second cavity part is at least equal to 15 degrees.

4. A tread for a tire of a civil engineering work vehicle, this vehicle being intended to carry very heavy loads, the tread comprising:
   a tread surface adapted to come into contact with the ground,
   edge parts that axially bound the tread;
   a thickness of material to be worn away at least equal to 60 mm, said thickness corresponding to the thickness of material measured between the tread surface adapted to come into contact with the ground in the new state and a previously set wear limit,
   the tread being provided with cuts delimiting material parts forming raised elements, each said raised element comprising a contact face, all of the contact faces of all the raised elements forming the tread surface of the tread,
   there also being formed, in a plurality of said raised elements, at least one ventilation cavity that opens in the new state onto the contact face of said raised elements, each said ventilation cavity having a depth at least equal to 70% of the thickness of material of the tread to be worn away, each said ventilation cavity being delimited by a wall surface ending at a bottom surface, the wall surface of a said ventilation cavity intersecting the tread surface along a closed corner edge contour,
   the tread being such that each said ventilation cavity comprises a first cavity part that is continued into the depth by a second cavity part, said second cavity part connecting to a cavity bottom wherein,
   in the first cavity part situated between the tread surface and an intermediate depth level H1 situated at between 30% and 70% of the maximum depth H of the ventilation cavity,
   wherein the mean relief angle A of the wall delimiting the ventilation cavity is at least equal to 20 degrees, while, in the second cavity part that continues the first cavity part into the depth as far as the bottom of the cavity, the mean relief angle B of the wall delimiting the ventilation cavity is at most equal to 15 degrees, and
   wherein at least one intermediate part forming a plateau separating the first cavity part from the second cavity part is formed, said plateau being inclined at a mean angle equal or close to 90 degrees to a direction perpendicular to the contact face, wherein the ventilation cavities intersect the contact faces of the raised elements along a contour having the shape of an ellipse, the major axis of which is oriented transversely, wherein the major axis has a different length than a minor axis of the ellipse of the first cavity part.

5. The tread according to claim 1 or claim 4, wherein the width L22 of the ventilation cavity measured close to the bottom of said cavity is less than 33% of the total depth H of the ventilation cavity in the new state, the width L22 being measured at a distance from the bottom corresponding to 10% of the total depth H of the ventilation cavity in the new state.

6. The tread according to claim 1 or claim 4, wherein the ventilation cavities are formed on each edge part axially delimiting the tread.

7. The tread according to claim 6, wherein the edges of the tread have blocks separated by oblique or transverse grooves, and wherein the maximum circumferential dimensions of the ventilation cavities formed in each of these blocks are between 30% and 60% of the circumferential lengths of these blocks.

8. The tire provided with a tread as defined in claim 1 or claim 4, wherein the tire is adapted to be fitted to a front axle of a civil engineering vehicle intended to carry very heavy loads.

9. The tire according to claim 8, comprising a crown reinforcement radially on the inside of the tread, wherein the innermost points of the bottom of the ventilation cavities are at a non-zero distance from the crown reinforcement, said distance being at least equal to 10% of the maximum depth H of the ventilation cavities.

10. A tire adapted to be fitted to a front axle of a civil engineering vehicle adapted to carry very heavy loads, the tire being provided with a tread, the tread having a tread surface adapted to come into contact with the ground, the tread being axially bounded by edge parts, the tread having a thickness of material to be worn away at least equal to 60 mm, said thickness corresponding to the thickness of material measured between the tread surface adapted to come into contact with the ground in the new state and a previously set wear limit, the tread being provided with cuts delimiting material parts forming raised elements, each said raised element comprising a contact face, all of the contact faces of all the raised elements forming the tread surface of the tread, there also being formed, in a plurality of said raised elements, at least one ventilation cavity that opens in the new state onto the contact face of the raised elements, each said ventilation cavity having a depth at least equal to 70% of the thickness of material of the tread to be worn away, each said ventilation cavity being delimited by a wall surface ending at a bottom surface, the wall surface of a ventilation cavity intersecting the tread surface along a closed corner edge contour, the tread being such that each said ventilation cavity comprises a first cavity part that is continued into the depth by a second cavity part, said second cavity part connecting to a cavity bottom, the tread being such that, in the first cavity part situated between the tread surface of the tread and an intermediate depth level H1 situated at between 30% and 70% of the maximum depth H of the ventilation cavity, the mean relief angle A of the wall delimiting the ventilation cavity is at least equal to 20 degrees, while, in the second cavity part that continues the first cavity part into the depth as far as the bottom of the cavity, the mean relief angle B of the wall delimiting the ventilation cavity is at most equal to 15 degrees, and a crown reinforcement radially on the inside of the tread, wherein the innermost points of the bottom of the ventilation cavities are at a non-zero distance from the crown reinforcement, said distance being at least equal to 10% of the maximum depth H of the ventilation cavities, wherein the ventilation cavity intersects the contact faces of the raised elements along a contour having the shape of an ellipse, the major axis of which is oriented transversely, wherein the major axis has a different length than a minor axis of the ellipse of the first cavity part.

11. The tread according to claim 1 or claim 4, wherein the second cavity part is an ellipses, wherein a major axis of the second cavity part is at a different orientation than the major axis of the first part, wherein the major axis has a different length than a minor axis of the ellipse of the second cavity part.

12. The tread according to claim 10, further comprising:

an intermediate part arranged in the ventilation cavity that makes an angle of 15 degrees with the tread surface in the new state.

* * * * *